United States Patent [19]
Foley

[11] 3,975,475
[45] Aug. 17, 1976

[54] WIPING SPINNERET FACE WITH COOLED WIPER

[75] Inventor: Joe Alvin Foley, Ridgeway, Va.

[73] Assignee: E. I. Du Pont de Nemours and Company, Wilmington, Del.

[22] Filed: Dec. 17, 1974

[21] Appl. No.: 533,533

[52] U.S. Cl. ................................ 264/28; 15/246; 30/310; 264/39; 264/169; 425/225; 425/464
[51] Int. Cl.² ..................... B08B 13/00; B28B 7/04
[58] Field of Search .............. 15/236, 346; 241/166; 264/28, 39, 169; 425/225, 226, 232, 311, 363, 464; 30/310

[56] References Cited
UNITED STATES PATENTS

| 3,153,685 | 10/1964 | O'Connor | 264/28 |
| 3,804,569 | 4/1974 | Walker | 425/225 |
| 3,852,387 | 12/1974 | Bortnick et al. | 264/40 |
| 3,856,885 | 12/1974 | Turaga et al. | 260/862 |

FOREIGN PATENTS OR APPLICATIONS

| 1,186,605 | 2/1965 | Germany | 264/28 |

*Primary Examiner*—Jay H. Woo

[57] ABSTRACT

Accumulated deposits are removed from the face of a spinneret by periodically manually wiping the face of the spinneret with the blade of a hand held wipe stick. Cooling the blade just before use decreases the smearing of the polymer melt and increases the wipe cycle. Dry ice is the preferred cooling medium.

4 Claims, 1 Drawing Figure

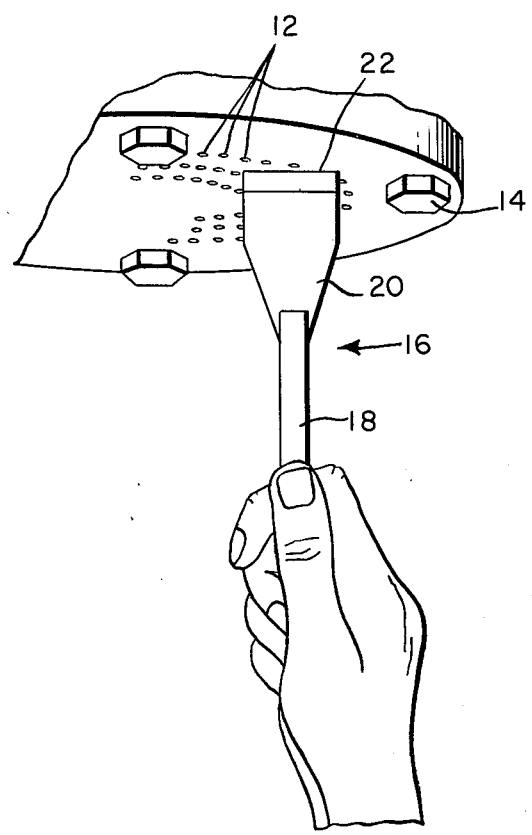

WIPING SPINNERET FACE WITH COOLED WIPER

BACKGROUND OF THE INVENTION

This invention relates to a process for cleaning the face of a spinneret with a wipe stick.

In conventional melt spinning of synthetic fibers from thermoplastic polymers, polymeric material heated to a plastic, flowable state is forced under pressure through spinneret capillaries to form filaments. After suitable further treatment, such as cooling and stretching, the filaments are wound onto packages or formed into tows for further processing. During the extrusion process, deposits of polymeric and/or degraded polymeric ingredients accumulate on the exit face of the spinneret surrounding each capillary. Periodic wiping (or scraping) the face of the spinneret by an operator with a hand held tool referred to as a wipe stick removes the accumulations and prolongs the period of useful spinning before major disassembly and cleaning of the spinneret pack becomes necessary.

Wiping of spinnerets is well known and routinely practiced in melt-spinning operations. It is definitely an art, and variations in wiping technique among operating personnel lead to differences in uniformity and completeness of the wiping operation. Thus, subsequent spinning performance is dependent on the skill of the operator.

Recent developments in the melt spinning art have added to the difficulty of satisfactory spinneret wiping, even by skilled operators. It has become rather common to surround the spinneret exit with shrouds, heaters, and/or devices for blanketing the face of the spinneret with an inert gas. To the extent that these devices limit access to the spinneret or restrict freedom of movement, the difficulty in providing satisfactory wipes is multiplied.

SUMMARY OF THE INVENTION

Wipe efficiency is improved according to this invention by cooling at least the blade of the wipe stick just before use to a sufficiently low temperature that the temperature of the blade edge contacting the spinneret remains below room temperature, and preferably below 0°C. during the course of each wipe. A preferred cooling technique involves exposing the blade to dry ice (solid carbon dioxide) before each wipe. Other cooling media known to maintain sub-zero temperatures may also be employed, such as liquid nitrogen or dry ice/acetone mixtures for example.

BRIEF DESCRIPTION OF THE DRAWING

The drawing is a perspective view of a wipe stick in use during a wipe cycle.

DETAILED DESCRIPTION OF THE PREFERRED EMBODIMENT

The drawing shows a part of a standard melt spinning spinneret 10 which is normally a steel plate of sufficient thickness to withstand extrusion pressures associated with the melt spinning of synthetic filaments. Molten polymer is forced under pressure by means not shown through the spinneret orifices 12. The spinneret is bolted by bolts 14 to the spinning block of a melt spinning machine (not shown). A hand held wipe stick 16 comprising a handle 18 joined to a blade 20 is shown in a wiping position against the face of spinneret 10.

Blade 20 is customarily formed of soft, ductile, metallic material, such as brass with a width ordinarily within the range of 1 to 2 inches (2.5 to 5.1 cm.) and a thickness of from 0.0625 to 0.125 inch (0.159 to 0.318 cm.). Working edge 22 (i.e., the portion which contacts the spinneret face) is usually a sharp edge. Wipe sticks heretofore used have ordinarily had handles 18 of the same material as blade 20. For use according to this invention, however, it is preferred either to form handle 18 of material with very low coefficient of thermal conductivity or to wrap handle 18 with thermal insulation.

In operation, the blade 20 of wipe stick 16 is immersed in powdered dry ice for at least about one minute before use. Then the wiping of spinneret face 10 is accomplished by the operator who grasps handle 18 and places blade 20 in contact with the spinneret face and then in a series of circular motions matched to the spinneret hole pattern makes a circuit with the blade a minimum of once around the spinneret ending with contact smoothly released from the spinneret face. The blade is then reimmersed in the dry ice prior to wiping the next position.

The use of wipe sticks with cold blades reduces the tendency for smearing of molten polymer across the face of the spinneret during wiping, thus reducing the frequency of filament breaks during spinning. It can also permit lengthening the period between wipes. Although cold blades are most advantageous in situations where wiping is especially difficult, they also are valuable for more routine wiping in that they tend to eliminate differences in operator technique and to enable less experienced operators to perform satisfactory wipes.

EXAMPLE

This example illustrates the improved spinning performance obtained when wipe sticks employed are cooled just prior to each wiping operation.

Polyhexamethylene adipamide (66 nylon) is melt spun to form filaments which, when quenched, converged, subsequently drawn and wound into packages, form 70-denier 34-filament yarn. Relative viscosity of the polymer flake employed is 34 (the ratio of absolute viscosities at 25°C. of polymer solution and its solvent when the solvent is 90% formic acid and the solution is made of 5.5 gm. of polymer in 50 ml. of solvent at 25°C.). Temperature of the polymer melt as it enters the spinning pack is 291°C., and the spinning speed is 1400 yd./min. (1280 m./min.).

The spinneret employed is as disclosed in Akers & Crewe, U.S. Pat. No. 3,814,559; i.e., apparatus is provided for blanketing the face of the spinneret with steam. The steam crossing the face of the spinneret is at about 250°–275°C. Wiping of spinnerets during steam blanketing is very difficult, and the incidence of threadline interruptions (unscheduled threadline breaks resulting in loss of productivity) is high.

In this spinning operation, there are 16 spinning positions with 2 yarns being formed at each position. After 6 days of break-in operation during which about 19 wipes with uncooled wipe blades are performed, three consecutive periods of test operation are performed. In period I, uncooled wipe blades are used at normal wipe intervals. In period II, cooled wipe blades are used at normal wipe intervals. In period III, cooled wipe blades are used at intervals approximately twice normal. When cooled wipe blades are used, the blade of the wipe stick is immersed in powdered dry ice for at least one minute before wiping one position only, and then reimmersed in the dry ice. It is observed that the working edge at the completion of each wipe is still very cold to the touch. Results obtained are:

| Period | Test Period (days) | No. of wipes performed | Threadline interruptions per day |
|---|---|---|---|
| I | 4 | 13 | 32.7 |
| II | 6 | 21 | 16.3 |
| III | 14 | 24 | 11.3 |

It is clear that cooling of the wipe blade as described decreases the frequency of threadline interruptions.

What is claimed is:

1. In a melt spinning process that includes the steps of extruding a molten polymeric material under pressure through holes formed in the face of a spinneret and periodically wiping the face of the spinneret with the blade of a wipe stick to remove deposits of decomposed polymeric material, the improvement comprising: cooling the blade of the wipe stick to a temperature below 0°C. before using thereby reducing the tendency of smearing the molten polymeric material across the face of the spinneret during wiping.

2. The process as defined in claim 1, the cooling step being carried out by immersing the blade in dry ice.

3. The process as defined in claim 2, said blade being immersed in dry ice for at least one minute.

4. The process as defined in claim 3, said dry ice being powdered.

* * * * *